Jan. 3, 1967 R. A. RIGHTMIRE ETAL 3,296,031
ELECTROCHEMICAL PROCESS OF PRODUCING ELECTRICAL ENERGY USING
SULFUR DIOXIDE FUEL AND HALOGEN OXIDANT
Filed Oct. 29, 1965
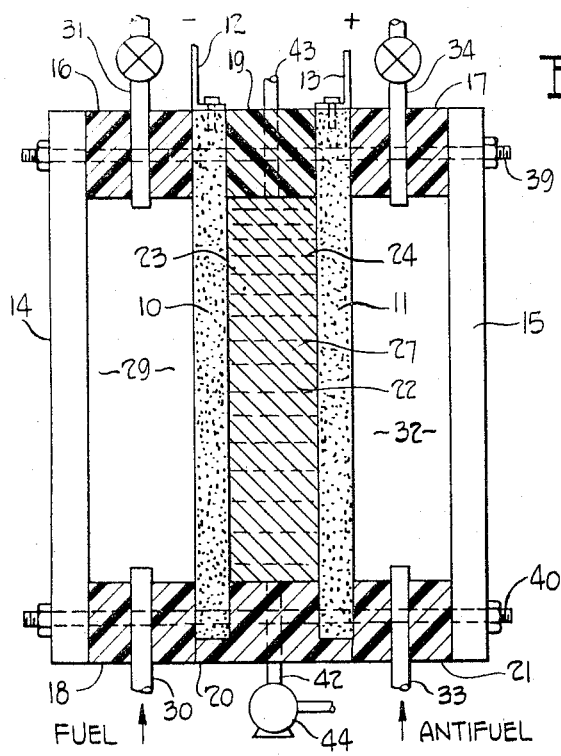
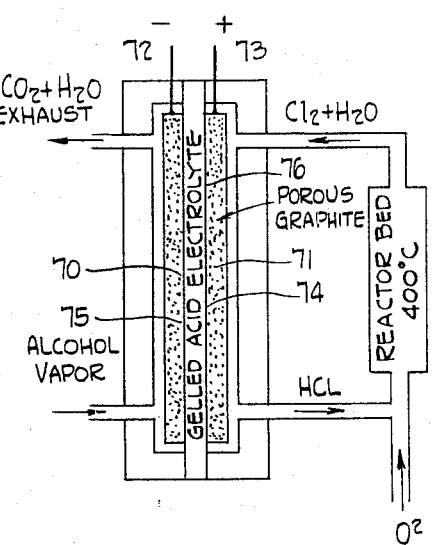
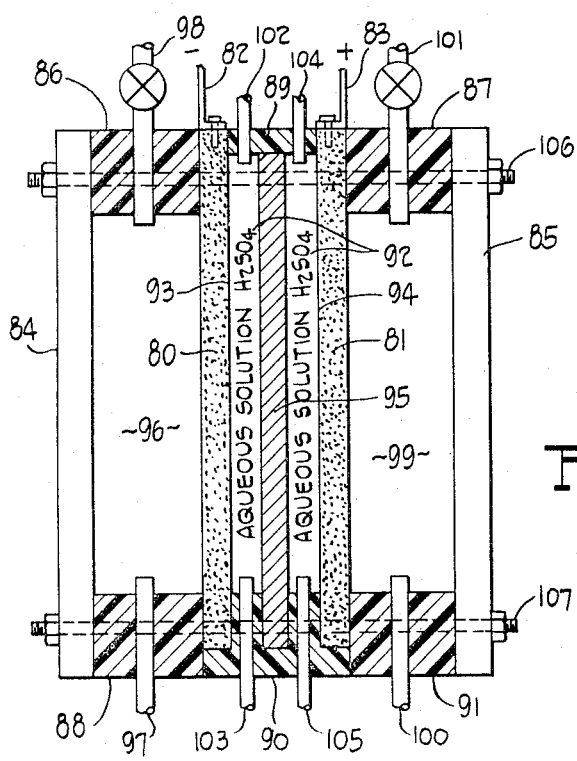
INVENTORS.
ROBERT A. RIGHTMIRE
BY PHILIP S. FAY
ATTORNEYS.

United States Patent Office 3,296,031
Patented Jan. 3, 1967

3,296,031
ELECTROCHEMICAL PROCESS OF PRODUCING ELECTRICAL ENERGY USING SULFUR DIOXIDE FUEL AND HALOGEN OXIDANT
Robert A. Rightmire, Twinsburg, and Philip S. Fay, Cleveland, Ohio, assignors to The Standard Oil Company, Cleveland, Ohio, a corporation of Ohio
Filed Oct. 29, 1965, Ser. No. 505,708
9 Claims. (Cl. 136—86)

This application is a continuation-in-part of copending application Serial No. 139,428, filed September 20, 1961.

This invention relates to the conversion of one form of energy to another, and more particularly to a novel process and system for accomplishing such conversion electrochemically. More specifically, this invention relates to improvements in regenerating and recycling electrochemical reactant materials.

The direct conversion of chemical energy into electrical energy is accomplished by causing chemical reactions to take place between reactant materials at reactive interfaces formed between spaced electrodes and an intermediate electrolyte, to form a continuous energy exchange system. The reactant materials are separately supplied to each respective reactive interface so that the charge exchange of the electrochemical reaction takes place ionically through the electrolyte, thereby forming an internal circuit; and electronically through the electrodes, forming part of an external circuit. Thus where the reactant materials are continuously supplied and an electrical load is coupled to the external circuit, it is possible to electrochemically convert the energy of electrochemical reaction directly into electrical energy in the external circuit.

For example, if hydrogen is employed as one of the reactants and chlorine as the other, the oxidation and reduction of these materials at the corresponding reaction interfaces generates electrical energy in the external circuit and produces hydrogen chloride as the chemical by-product of the reaction. When each of these materials is continuously supplied and consumed within such a system, it can be likened, respectively, to a fuel, and to an antifuel, the former of which is selected to yield electrons in its chemical reaction and the latter of which is selected to accept electrons.

Normally in any such system, the fuel and antifuel are supplied in a relatively stable state. It is believed that conversion of the fuel and antifuel takes place first by chemical adsorption to the chemisorbed state at the respective reactive interfaces; and then by desorption to the reaction product state at the respective reactive interfaces.

The conversion of the fuel and antifuel is not practically self-motivating, due to the relatively stable state of the reactants, and is therefore preferably activated by the introduction of some means into the electrolyte that will promote desorption at the respective reactive interfaces. In the preferred embodiment of this invention, such means are ionic in nature and coact to provide activating ions in the electrolyte.

Further, within the scope of the present invention, in addition to some means in the electrolyte to enhance the conversion, means are provided on the electrodes themselves to enhance the physical adsorption of the relatively stable reactants at the reactive interface.

The reaction products can be removed from the system in any convenient manner, and are preferably removed as formed.

For purposes of this description, a system for accomplishing the direct conversion of chemical energy into electrical energy will be identified as a fuel cell system. The electrodes will be identified as anode and cathode, respectively, depending upon whether on the fuel or antifuel side of the cell. The fuel will be identified as any substance that is oxidizable relative to the antifuel; and the antifuel will be identified as any substance that is reducible relative to the fuel; where oxidation and reduction, respectively, contemplate the release and acceptance of electrons.

A medium which is capable of conducting an electrical charge associated with an atom or group of atoms, i.e. ions, will be referred to as an electrolyte. The electrolyte serves to isolate the electrodes from one another in the internal circuit. The reactive interfaces are identified as the contact zones between the reactive electrode surfaces and the electrolyte. The activating means for promoting the conversion of the fuel and the antifuel from the raw reactant state through the chemisorbed state to the reaction product state will be specifically identified in conjunction with the functional coaction in the cell, as an adsorber and a desorber. The ions contained in the electrolyte usually activate desorption while adsorption is usually promoted by an activator in the nature of the electrode surface itself or a coacting material applied thereto, as will become evident later. The overall reaction will be referred to as an electrochemical reaction.

The electrolyte with the activator added can be neutral, or it can be acidic, or basic in character. A neutral medium will favor the transfer of both anions and cations. A basic medium normally favors the transfer of anions, i.e. it has the character of an electron donor. An acidic medium normally favors the transfer of cations, i.e. it has the character of a proton donor. Normally a fuel which is of electron donor character, i.e. is capable of being oxidized, will undergo chemical reaction at or near the fuel electrode, in an electron donor-type medium, e.g. a basic medium. In an electron acceptor-type medium, e.g. an acidic medium, the chemical reaction will normally occur at or near the antifuel electrode.

In the present invention the fuel and antifuel are desorbed by respective coacting activator ions. The resulting fuel and antifuel derived ions then combine to produce a reaction product in the liquid phase, which is removed from the apparatus.

We have found that under certain circumstances, hereinafter more particularly described, we can enhance the overall electrochemical reaction and increase the efficiency of the apparatus by chemically reconstituting the fuel and/or antifuel externally of the system, in the vapor phase, and then reintroducing the reconstituted fuel and/or antifuel to the electrochemical reaction system.

In one embodiment of the invention the fuel reactant and the antifuel reactant occur respectively in the environment of their respective subsystems, and the subsystems are isolated from one another by a medium that is permeable to either a fuel-derived ion (e.g. hydrogen) or to an antifuel-derived ion (e.g. halide). The respective reaction products from each subsystem are desirable independently removed, and in accordance with the invention, at least one of the reaction products is reconstituted by chemical oxidation or reduction externally of the system and resupplied in the form of the corresponding fuel and/or antifuel.

Broadly stated, the present invention relates to an electrochemical reaction system characterized by a pair of spaced electrodes and an electrolyte disposed therebetween, which electrolyte forms a reactive interface with each of the electrodes. Anions and cations are provided in the electrolyte by the addition of an activater, which can be a water-soluble acid, water-soluble base, or water-soluble salt. Individual means are also provided for supplying electrochemical fuel and antifuel reactants to each of the electrodes. Since the fuel and antifuel each undergo reaction to form reaction products, means are provided for respectively removing the reaction products separately.

In the case of the fuel, the reaction product is removed in the liquid phase and introduced into means external of the system for chemical reconstitution in vapor phase back to the fuel. Thus the fuel reaction product can be reconstituted by vapor phase reduction with hydrogen or a hydrogen yielding material. In the case of the antifuel, the reaction product is suitably removed and can be introduced into means externally of the system for chemical reconversion in the vapor phase back to the antifuel. An oxidant such as oxygen or air is utilized for reconversion of the antifuel reaction product. When the fuel and/or antifuel reaction product has been reconstituted back to fuel and/or antifuel it is then recycled to the electrochemical reaction system. Vapor phase reconstitution can be effected at any pressure in the range between sub-atmospheric to super-atmospheric and at a temperature sufficient to vaporize the reaction product. Usually in the present invention, atmospheric pressure and a temperature from about 100° C. to about 600° C. are employed in the presence of a suitable conversion catalyst.

In the annexed drawings:

FIGURE 1 is a schematic view of an electrochemical reaction system utilizing the principles of the present invention;

FIGURE 2 is a schematic view of another embodiment of an electrochemical reaction system employing the principles of the present invention; and FIGURE 3 illustrates still another application of the principles of the invention.

*The embodiment of FIGURE 1; single electrolyte cell*

This system includes a fuel electrode 10 and an antifuel electrode 11. These are positioned in spaced and insulated relation. The electrodes 10 and 11 are respectively provided with terminals 12 and 13 which are adapted to be connected to an external circuit to complete the electron conducting portion of the system. The external circuit is not shown. However, it is to be understood that this can be a motor, resistance element or other suitable device, that will provide a load against the internal circuit.

End plates 14 and 15 are provided to close off the ends of the unit cell shown in FIGURE 1. In multiple assemblies of unit cells of the type shown in FIGURE 1, unit cells can be stacked in such a way that end plates will be provided only at the extreme or terminal ends of the unit of a horizontally repeating series of unit cells. End plates 14 and 15 can be fabricated of metal, impervious graphite, ceramic or plastic materials, provided the material is chemically inert relative to the fuel or antifuel utilized in the adjacent chambers. If the end plates 14 and 15 are fabricated of electrically conductive material, suitable electrical insulating gaskets will be provided to insulate the plates from electrically active components of the cell. Spacer members 16, 17, 18, 19, 20 and 21 are provided to maintain the proper spacing between the respective end plates 14 and 15 and the electrodes 10 and 11. The spacers 16, 17, 18, 19, 20 and 21 can be fabricated of metal, impervious graphite, ceramic or plastic materials. These should be chemically inert relative to the fuel and antifuel and to the electrolyte, and provision should be made for electrically insulating the spacers from the adjacent electrodes in the event that an electrically conducting material is selected.

Both the fuel electrode 10 and the antifuel electrode 11 can be fabricated of any porous electrically conductive material which is inert to chemical attack by the reactants and the electrolyte. Electrodes fabricated of porous carbon have been found satisfactory. While porous carbon as such can be employed as the electrode, it has been found desirable to further enhance the electrochemical activity by providing electrodes of a porous metal such as porous sintered nickel, or by depositing a finely divided metal activator, e.g. platinum, or metal oxide, e.g. vanadium pentoxide, on the surface of a porous carbon electrode. Such activators are believed to enhance physical adsorption of the fuel and antifuel material prerequisite to chemisorption and then desorption at the respective reaction interfaces.

Disposed between the electrodes 10 and 11 and electronically insulating such electrodes is an electrolyte which functions as an ion-containing and conducting medium. While any electrolyte medium capable of transferring an electrical charge by means of ions between electrodes 10 and 11 can be employed, in the specific embodiment shown in FIGURE 1, the electrolyte 22 is aqueous 6 molar sulfuric acid supported on a porous clay matrix 27. Also within the scope of the invention, concentrated hydrochloric acid can be used as a proton donor-type electrolyte. No matter what the electrolyte, it forms reactive interfaces 23 and 24 respectively by contacting the surfaces of the electrodes 10 and 11.

The fuel subsystem, which is an example of a relatively oxidizable subsystem, includes a fuel reservoir 29, the fuel electrode 10 and the reactive interface 23. The antifuel subsystem, which is an example of a relatively reducible subsystem, includes the antifuel reservoir 32, the antifuel electrode 11 and the reactive interface 24.

The chamber 29 defined by the end plate 14 and fuel electrode 10 and marginally enclosed by spacers 16, 18 and 20, is adapted to receive a suitable fuel such as molecular sulfur dioxide or a fuel containing material, such for example as molecular sulfur dioxide dissolved in concentrated sulfuric acid. The fuel is circulated through the inlet 30 and thence through chamber 29 and out through the outlet 31. The outlet 31 can be provided with valve means for regulating the rate of flow of material through the fuel chamber 29.

The antifuel side of the cell is similarly provided with an antifuel chamber 32 having an inlet 33 in the spacer 21 and an outlet 34 in the spacer 17. The spacers 21 and 17, together with spacer 20, the electrode 11 and the end plate 15 marginally enclose the chamber 32. Means are thus provided for circulating the antifuel, or antifuel-containing material, as the case may be, through the chamber 32.

The products of electrochemical reaction are under most circumstances soluble in the aqueous electrolyte 22, that is retained in the porous clay matrix between the electrodes 10 and 11. The electrolyte 22 with the electrochemical reaction product dissolved in it can be exhausted from the cell in the liquid phase through the outlet 43. Then by means of a conventional thermal or vacuum stripping operation, the reaction product can be stripped from the electrolyte 22. The electrolyte is recycled to the system through a pump 44 and inlet 42. The reaction product is externally regenerated in the vapor phase.

A specific example of a fuel which reacts electrochemically in the presence of aqueous 6 molar sulfuric acid to form a reaction product removable in the liquid phase and capable of vapor phase regeneration by a reduction with hydrogen is sulfur dioxide. This material reacts to from sulfur trioxide in solution in the sulfuric acid electrolyte according to the equation:

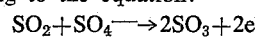

$$SO_2 + SO_4^{--} \rightarrow 2SO_3 + 2e$$

In accordance with the present invention, the sulfur trioxide by-product is reduced in the vapor phase in the presence of a reduction catalyst such as Raney nickel to regenerate sulfur dioxide fuel.

*The embodiment of FIGURE 3; dual electrolyte system*

In this embodiment the cell has electrodes 80 and 81 supported in spaced and insulated relationship. Electrode 80 is the fuel electrode and electrode 81 is the antifuel electrode. Electrodes 80 and 81 are provided with terminals 82 and 83 that are adapted to provide a connection to an external circuit to complete the electron conducting portion of the system. The external circuit would additionally include some kind of a power consuming device such as a motor or the like.

End plates 84 and 85 are provided to close off the ends of the single cell unit shown in FIGURE 3. These can be fabricated of metal or other inert materials as discussed above. Spacer members 86, 87, 88, 89, 90 and 91 are provided to maintain a proper spacing between the end plates 84 and 85 and the electrodes 80 and 81. The spacers can be fabricated of metal or other inert material as described above.

Both the fuel electrode 80 and the antifuel electrode 81 can be fabricated of any porus, electrically conducting material as described above. Electrodes of porous carbon have been found satisfactory. Activators to enhance the electrochemical activity also can be employed as surface coatings on the electrodes, as previously mentioned.

Disposed between the electrodes 80 and 81 and electronically isolating the electrodes is a dual electrolyte system, as distinguished from the single electrolyte system of the embodiment of FIGURE 1. Thus two electrolytes 92 are employed in this embodiment. Also in this system, an ion-permeable barrier 95 is employed to isolated the fuel subsystem electrolyte from the antifuel subsystem electrolyte. In this invention the electrolyte media 92 are each composed of aqueous 6 normal sulfuric acid. These media form reaction interfaces 93 and 94 respectively with the electrodes 80 and 81.

The portions of the ion transfer media 92 at the reaction interfaces 93 and 94 are maintained separate from one another by means of the ion-permeable barrier 95, which in the specific embodiment shown in FIGURE 3, is preferably a palladium foil. Palladium has the property of permeability to hydrogen ions. Hence hydrogen ions resulting in the course of the electrochemical reaction can pass through the palladium barrier under the influence of a concentration gradient of hydrogen ions, for reaction with an ion, e.g. halogen, derived from the antifuel. Thus the aqueous sulfuric acid electrolytes 92 and the palladium barrier 95 coact to form an ion-transfer medium. Actually any hydrogen-bridge type barrier can be used to isolate the subsystems while permitting transfer of hydrogen either molecularly, atomically, or ionically from one subsystem to the other.

The chamber 96 defined by the end plate 94 and the fuel electrode 80, and marginally enclosed by spacers 86 and 88, is adapted to receive a fuel, e.g. gaseous sulfur dioxide; or a fuel containing material, e.g. sulfur dioxide dissolved in aqueous 6 normal sulfuric acid, which is circulated through inlet 97 and out of outlet 98. The antifuel side of the cell is similarly provided with an antifuel chamber 99, having an inlet 100 in spacer 91, and an outlet 101 in spacer 87. The spacers 91 and 87 marginally enclose the chamber 99 along with the electrode 81 and the end plate 85. Means are thus provided for circulating the antifuel or antifuel-containing material through the chamber 99.

A fuel material that has provided unusually good results in the present invention is molecular sulfur dioxide, either used as a gas per se or as a gas dissolved in aqueous sulfuric acid. This material can be introduced into the fuel chamber 96. Aqueous 6 normal sulfuric acid is slowly circulated between the electrode 80 and the ion-permeable barrier 95 by means of inlet 103 and outlet 102 to provide the electrolyte medium 92. Thus, gaseous sulfur dioxide can be introduced through inlet 97 for upward flow, and aqueous 6 normal sulfuric acid can be introduced through the inlet 103 also for upward flow. Although concurrent flow is thus described relative to FIGURE 3, for these respective streams, counter-current flow also can be employed within the scope of the invention.

At the reaction interface 93, the sulfur dioxide becomes adsorbed and proceeds to the chemisorbed state. As discussed above, the electrode can contain an activator coating such as nickel oxide, vanadium pentoxide, molybdenum oxide or the like. The sulphate ion in the aqueous sulfuric acid electrolyte 92 is an activator for desorption of the chemisorbed sulfur dioxide and reacts therewith to form sulfur trioxide in the aqueous acidic electrolyte, with the release of two electrons to the electrode 80 and thus to the external circuit.

The aqueous sulfuric acid between the electrode 80 and the ion-permeable barrier 95 contains the by-product sulfur trioxide. This is removed from the outlet 102 and is stripped by conventional means. Thus water vapor and any developed gases are separated from the $SO_3$-aqueous sulfuric acid mixture. Thereafter, the $SO_3$-sulfuric acid mixture is passed through a furnace which raises the temperature of the mixture to about 550° C. The hot gases are mixed with a reducing agent, which in the specific instance can be a hydrocarbon, namely propane. Upon passing through a converter, similar to that shown at the right of FIGURE 2 and discussed below, a mixture of hydrocarbon and $SO_3$ in the presence of some water and vanadium pentoxide catalyst at 500° C. reacts to restore the original sulfur dioxide fuel according to the following equation:

$$C_3H_8 + 10SO_3 \rightarrow 3CO_2 + 4H_2O + 10SO_2\uparrow$$

The reconstituted sulfur dioxide from this reconversion is returned to the fuel subsystem where the sulfur dioxide again undergoes electrochemical conversion to the reaction product sulfur trioxide.

A coacting antifuel, e.g., a halogen such as chlorine, is simultaneously introduced into the antifuel chamber 99, while electrolyte 92 is introduced through the inlet 105 and exhausted through the outlet 104, together with antifuel subsystem reaction product, e.g., hydrogen halide. The cell of FIGURE 3 will operate at temperatures ranging from room temperature up to the boiling point of the electrolyte 92 at the pressure imposed thereon.

*The regenerator system of FIGURE 2*

In FIGURE 2, there is shown a fuel cell in which the antifuel material is restored by chemical means in the vapor phase, and the fuel is consumed within the cell to form a reaction product that is discarded. Thus the cell comprises a fuel electrode 70 and an antifuel electrode 71, positioned in spaced, insulated relationship relative to one another. Suitable leads 72 and 73 from the electrodes 70 and 71 are provided which are adapted to be connected to an external circuit, not shown. The fuel electrode 70 is conveniently formed of platinized porous graphite having an adsorption activator, e.g., platinum in finely divided form on the reactive surface.

Disposed between the electrodes 70 and 71 is an electrolyte 74 which is conventionally a gelled aqueous acidic solution, e.g., a bentonite-sulfuric acid-water gel.

In this example the fuel can be a hydrogen containing material such as ethyl alcohol, and this is fed to the fuel electrode 70. Being an oxidizable material, the alcohol undergoes electrochemical reaction at the interface 75 to produce hydrogen ions, carbon dioxide, and water vapor as by-products in the electrolyte 74 between the electrodes 70 and 71. At the same time the fuel releases electrons to the fuel electrode 70.

The antifuel is preferably a halogen such as chlorine, bromine, iodine or fluorine. Molecular gaseous chlorine, desirably although not necessarily in the presence of water vapor, is conveniently fed to the antifuel electrode 71, which it permeates. At the reaction interface 76, the chlorine is reduced with the acceptance of an electron from the antifuel electrode 71 and the reaction with hydrogen ions derived from the fuel, produces aqueous hydrochloric acid as the by-product in the electrolyte central zone. Where bromine is used as the antifuel, aqueous hydrogen bromide is produced as the reaction by-product.

The by-product solution is withdrawn from the cell as shown in FIGURE 2, admixed with an oxidizing agent such as air, and passed into a heated reactor containing a bed of cupric chloride catalyst supported on silica gel.

The reaction temperature within the converter is maintained between 300° C. and 460° C. under which conditions HCl or HBr is oxidized in the vapor phase to restore the original antifuel such as chlorine or bromine as the case may be. Electrochemical cells of the type hereinbefore described can be operated at temperatures from room temperature to about 200° C. under atmospheric or superatmospheric pressures.

In the embodiment of FIGURE 2, ethyl alcohol has been described as a suitable fuel. It is to be understood however that this is illustrative, and other fuels can be used including methyl alcohol, isopropyl alcohol, butyl alcohol, hydrocarbons such as ethylene, propylene, propane, butane, pentane, hexane, cyclohexane and the like. Where the fuels are water-soluble, such as in the case of alcohols, these can be introduced as aqueous solutions; or as vapor mixtures, the latter being preferred.

Where the antifuel is bromine, it can be conveniently dissolved in aqueous sulfuric acid, e.g. aqueous 6 molar sulfuric acid, and introduced as a composite antifuel-containing material into the antifuel chamber. The bromine undergoes an electrochemical reaction at the reaction interface according to the equation:

$$Br_2 + 2e + 2H+ \rightarrow 2HBr$$

The hydrogen ions from the reaction are continuously supplied by transfer of hydrogen through the aqueous sulfuric acid, which acts as the hydrogen bridge. The electrons are supplied from the external circuit through the electrode.

The aqueous sulfuric acid solution containing the hydrogen bromide antifuel electrochemical reactant product in solution can be removed through the appropriate outlet. The hydrogen halide is then separated from the aqueous sulfuric acid solution by conventional means, not shown, and the aqueous acid is returned to the system. The hydrogen bromide reaction product can then be treated in an analogous manner as the HCl above described. Thus the temperature of the hydrogen bromide solution is raised to about 450° C., and the hot gases admixed with an oxidizing agent, for example, air, and passed through the reactor bed. The mixture of air, hydrogen bromide and some retained water vapor in the presence of a cupric chloride silica gel catalyst at 300° to 400° C. or a platinized alumina catalyst reacts according to the equation:

$$4HBr + O_2 \rightarrow 2H_2O + 2Br_2$$

The water can be removed by conventional means. Thus, the antifuel is restored from the antifuel electrochemical reaction product. The restored antifuel is reintroduced into the antifuel inlet of the antifuel subsystem where the bromine again reacts electrochemically in another cycle.

Thus, there has been provided an electrochemical reaction system and process, such as a fuel cell, in which the overall cell reaction has been enhanced by providing fuel-containing and/or antifuel-containing reactant materials which react electrochemically to form reaction by-products that are conveniently removed from the system in the liquid phase. One or both of the respective reaction by-products of the subsystems is independenly removed from the apparatus and chemically reconstituted in the vapor phase to a fuel or antifuel as the case may be, for reintroduction into the system for the production of further electrical energy.

What is claimed is:

1. In a process of producing electrical energy from an electrochemical reaction system comprising a relatively oxidizable subsystem, a relatively reducible subsystem, ion-permeable means separating said subsystems, an electrode in each of said subsystems, each electrode coupled to an external electron conducting circuit, and means for supporting the respective subsystems and electrodes in coacting relationship, the steps of placing concentrated aqueous sulfuric acid in the relatively oxidizable subsystem as ion-transfer medium, separated by the ion-permeable means from the other subsystem, to form a reaction interface with the electrode, placing a concentrated aqueous mineral acid in the relatively reducible subsystem as ion-transfer medium, separated by the ion-permeable means from the other subsystem to form a reaction interface with the electrode, supplying molecular $SO_2$ to the ion-transfer medium of the relatively oxidizable subsystem and to the reaction interface and causing the $SO_2$ to react electrochemically with the oxygen ion species of the ion-transfer medium to produce $SO_3$, supplying an elemental halogen to said relatively reducible subsystem and causing the halogen to react electrochemically at the reaction interface in said relatively reducible subsystem with hydrogen ion species of the ion-transfer medium to produce hydrogen halide, removing the $SO_3$ from said relatively oxidizable subsystem in combination with residual ion-transfer medium, recovering the $SO_3$ externally of the subsystem and reconverting to $SO_2$ by reduction in the vapor phase in the presence of a reducing catalyst, resupplying reconverted $SO_2$ to said reltaively oxidizable subsystem for the production of further electrical energy, removing the reaction product from said antifuel subsystem, and supplying additional elemental halogen to said antifuel subsystem for the production of further energy.

2. The invention of claim 1 wherein the aqueous sulfuric acid supplied to the relatively oxidizable subsystem is 6 normal concentration, and including the steps of removing hydrogen halide reaction by-product from the relatively reducible subsystem, converting the hydrogen halide to halogen by oxidation in the vapor phase in the presence of an oxidation catalyst, and recycling both the reconverted $SO_2$ and reconverted halogen to the respective subsystems for the production of further electrical energy.

3. The invention of claim 1 wherein the concentrated mineral acid supplied to the relatively reducible subsystem is selected from the group of concentrated aqueous sulfuric acid and concentrated aqueous hydrochloric acid.

4. The invention of claim 1 wherein the concentrated aqueous sulfuric acid is 6 molar sulfuric acid.

5. The invention of claim 1 wherein the concentrated aqueous sulfuric acid supplied to the relatively oxidizable subsystem is 6 molar sulfuric acid, and wherein the concentrated mineral acid supplied to the relatively reducible subsystem is selected from the group of concentrated aqueous sulfuric acid and concentrated aqueous hydrochloric acid.

6. The invention of claim 1 including the step of reconverting the $SO_3$ to $SO_2$ by reduction in the vapor phase in the presence of a hydrogen-containing reducing agent and a reduction catalyst selected from the group of Raney nickel and platinized asbestos, at a temperature of about 550° C.

7. In a process of producing electrical energy from an electrochemical reaction system comprising a relatively oxidizable subsystem, a relatively reducible subsystem, an electrode in each of said subsystems, each electrode coupled to an external electron conducting circuit, and means for supporting the respective subsystems and electrodes in coacting relation, the steps of supplying $SO_2$ dissolved in aqueous 6 normal sulfuric acid to the relatively oxidizable subsystem and into contact with the electrode thereof to provide a reaction interface with the electrode, supplying an elemental halogen in aqueous sulfuric acid to said relatively reducible subsystem and into contact with the electrode thereof to provide a reaction interface with the electrode, maintaining each of said subsystems in liquid phase, causing said $SO_2$ to react electrochemically at the reaction interface in said relatively oxidizable subsystem with oxygen ion species of the sulfuric acid to produce $SO_3$ as the chemical reaction product, causing said halogen to react electrochemically at the reaction interface in said relatively reducible subsystem with hydrogen ion species of the sulfuric acid to produce hydrogen halide as chemical reaction product, removing the reaction product $SO_3$ from said relatively oxidizable subsystem, converting the $SO_3$ to $SO_2$ by reduction in the vapor phase in the presence of a reducing catalyst, removing hydrogen halide reaction by-product from said relatively reducible subsystem, converting the hydrogen halide to halogen by oxidation in the vapor phase in the presence of an oxidation catalyst, and recycling both the reconverted $SO_2$ and the reconverted halogen to the respective subsystems for the production of further electrical energy.

8. In a process of producing electrical energy from an electrochemical reaction system comprising a relatively reducible subsystem, a relatively oxidizable subsystem, an ion-transfer medium for electrochemical coaction in each of said subsystems, an electrode disposed in each of said subsystems, and each electrode coupled to an external electron conducting circuit and forming a reaction interface with the ion-transfer medium, means for supporting the respective subsystems and electrodes in operative coacting relation, the steps of ionically dissociating a respective activator compound in the ion-transfer medium of the relatively oxidizable subsystem capable of producing $SO_4^{--}$ ions in the ion-transfer medium of the relatively oxidizable subsystem, supplying an oxidizable fuel comprising $SO_2$ to the ion-transfer medium of the relatively oxidizable subsystem and to the reactive interface in said subsystem, causing said fuel to react electrochemically at the reaction interface in said relatively oxidizable subsystem with an ion species of said activator to produce $SO_3$ as a chemical reaction product, removing the chemical reaction product $SO_3$ from said relatively oxidizable subsystem in combination with residual activator, separating the chemical reaction product $SO_3$ from said residual activator externally of said relatively oxidizable subsystem, chemically reconverting said chemical reaction product $SO_3$ to oxidizable fuel $SO_2$ externally of said relatively oxidizable subsystem, and resupplying said reconverted, oxidizable fuel $SO_2$ to said relatively oxidizable subsystem for the production of further electrical energy.

9. In a process of producing electrical energy from an electrochemical reaction system comprising a relatively reducible subsystem, a relatively oxidizable subsystem, an ion-transfer medium for electrochemical coaction in each of said subsystems, an electrode disposed in each of said subsystems, each electrode coupled to an external electron conducting circuit and forming a reaction interface with the ion-transfer medium, means for supporting the respective subsystems and electrodes in operable coacting relation, the steps of ionically dissociating an activator compound in the ion-transfer medium of the relatively oxidizable subsystem capable of producing $SO_4^{--}$ ions therein and to the reaction interface in said subsystem, ionically dissociating an activator compound in the ion-transfer medium in said relatively reducible subsystem capable of producing hydrogen ions therein, supplying $SO_2$ to the ion-transfer medium of the relatively oxidizable subsystem and to the reaction interface in said subsystem, supplying bromine to the ion-transfer medium of the relatively reducible subsystem and to the reaction interface in said subsystem, causing said $SO_2$ to react electrochemically at the reaction interface in said relatively oxidizable subsystem with the ion species of said activator to produce $SO_3$ as a chemical reaction product, causing said bromine to react electrochemically at the reaction interface in said relatively reducible subsystem with the ion species of said activator to produce HBr as a chemical reaction product, removing the $SO_3$ from said relatively oxidizable subsystem in combination with residual activator, removing the HBr from said relatively reducible subsystem in combination with residual activator, chemically reconverting said $SO_3$ to $SO_2$ externally of said relatively oxidizable subsystem, chemically reconverting said HBr to bromine externally of said relatively reducible subsystem, recycling said $SO_2$ to said relatively oxidizable subsystem, and recycling said bromine to said relatively reducible subsystem for the production of further electrical energy.

References Cited by the Examiner

UNITED STATES PATENTS 3,009,327  11/1961  Weil _____ 136—86 X
3,088,990  5/1963  Rightmire et al. _____ 136—86

WINSTON A. DOUGLAS, *Primary Examiner.*

A. B. CURTIS, *Assistant Examiner.*